US008171235B2

(12) United States Patent
Marr et al.

(10) Patent No.: US 8,171,235 B2
(45) Date of Patent: *May 1, 2012

(54) ATOMIC COMPARE AND SWAP USING DEDICATED PROCESSOR

(75) Inventors: James E. Marr, Burlingame, CA (US); John P. Bates, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 370 days.

This patent is subject to a terminal disclaimer.

(21) Appl. No.: 12/361,301

(22) Filed: Jan. 28, 2009

(65) Prior Publication Data

US 2009/0138675 A1    May 28, 2009

Related U.S. Application Data (63) Continuation of application No. 11/291,307, filed on Dec. 1, 2005, now Pat. No. 7,509,463.

(51) Int. Cl.
*G06F 12/00* (2006.01)
(52) U.S. Cl. .................................... 711/150
(58) Field of Classification Search .................. None
See application file for complete search history.

(56) References Cited

U.S. PATENT DOCUMENTS

| 5,581,777 | A | 12/1996 | Kim et al. ................ 712/16 |
| 5,864,706 | A | 1/1999 | Kurokawa et al. ......... 712/35 |
| 5,864,738 | A | 1/1999 | Kessler et al. ............ 709/239 |
| 6,029,212 | A | 2/2000 | Kessler et al. ............ 710/52 |
| 6,128,709 | A * | 10/2000 | Autechaud et al. ........ 711/151 |
| 6,880,071 | B2 * | 4/2005 | Steele et al. .............. 712/244 |
| 7,274,706 | B1 | 9/2007 | Nguyen et al. ............ 370/419 |
| 7,398,368 | B2 | 7/2008 | Marr et al. ............... 711/168 |
| 7,509,463 | B2 * | 3/2009 | Marr et al. ............... 711/155 |
| 2004/0193734 | A1 * | 9/2004 | Barron et al. ............. 709/250 |
| 2004/0236914 | A1 * | 11/2004 | Day et al. ................. 711/152 |
| 2005/0120185 | A1 | 6/2005 | Yamazaki et al. .......... 711/147 |
| 2007/0143551 | A1 | 6/2007 | Marr et al. ............... 711/154 |

OTHER PUBLICATIONS

"Mellanox Fields InfiniBand Blade Server Reference Platform." Jan. 28, 2002. Client Server News.*
Tom Shanley. InfiniBand network architecture. 2002. MindShare, Inc. pp. 244-245.*
IBM. Command and Technical Reference. May 2003. IBM. vol. 1. 6th ed. pp. 453-458.*
Alfred Z. Spector. "Performing Remote Operations Efficiently on a Local Computer Network." Apr. 1982. ACM. Communications of the ACM. vol. 25. No. 4. pp. 246-260.*
David B. Gustavson. "The Scalable Coherent Interface and Related Standards Projects." Feb. 1992. IEEE. IEEE Micro. pp. 10-22.*

(Continued)

*Primary Examiner* — Reginald Bragdon
*Assistant Examiner* — Nathan Sadler
(74) *Attorney, Agent, or Firm* — Joshua D. Isenberg; JDI Patent (57) ABSTRACT

An atomic compare and swap operation that can be implemented in processor system having first and second processors that have different sized memory transfer capabilities. The first processor notifies the second processor to perform a compare and swap operation on an address in main memory. The address has a size less than or equal to a maximum memory transfer size for the second processor and greater than a maximum memory transfer size for the first processor. The second processor atomically performs the compare and swap operation and notifies the first processor of the success or failure of the compare and swap operation.

38 Claims, 3 Drawing Sheets

OTHER PUBLICATIONS

Keir Fraser. "Practical lock-freedom." Feb. 2004. University of Cambridge Computer Laboratory. UCAM-CL-TR-579. pp. 29- 34.*

Notice of Allowance and Fee(s) Due dated Jan. 25, 2008 for U.S. Appl. No. 11/291,306.

U.S. Appl. No. 11/238,085, entitled "Method and System for Performing Memory Copy Function on a Cell Processor" to Antoine Labour et al., filed Sep. 27, 2005.

Sony Computer Entertainment Incorporated, "Cell Broadband Engine Architecture", Version 1.0, Aug. 8, 2005.

Non Final Office Action dated Feb. 1, 2008 for U.S. Appl. No. 11/291,307.

Notice of Allowance and Fee(s) Due dated Sep. 12, 2008 for U.S. Appl. No. 11/291,307.

* cited by examiner

ATOMIC COMPARE AND SWAP USING DEDICATED PROCESSOR

CLAIM OF PRIORITY

This application is a continuation of and claims the benefit of priority of commonly-assigned U.S. patent application Ser. No. 11/291,307 filed Dec. 1, 2005, now U.S. Pat. No. 7,509,463, the entire contents of which are incorporated herein by reference.

CROSS-REFERENCE TO RELATED APPLICATION

This application is related to commonly-assigned U.S. patent application Ser. No. 11/291,306 entitled "ATOMIC OPERATION INVOLVING PROCESSORS WITH DIFFERENT MEMORY TRANSFER OPERATION SIZES" to James E. Marr, John P. Bates and Tatsuya Iwamoto, which is filed the same day as the present application, the entire disclosures of which are incorporated herein by reference.

FIELD OF THE INVENTION

This invention relates to cell processors and more particularly to atomic operations with cell processors.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers.

A typical cell processor has one PPE and up to 8 SPE. Each SPE is typically a single chip or part of a single chip containing a main processor and a co-processor. Each SPE typically includes a synergistic processor unit (SPU) and a local store (LS). The PPE typically includes a power processor element (PPU) and one or more caches. All of the SPEs and the PPE can access a main memory, e.g., via the bus. The SPEs can perform parallel processing of operations in conjunction with a program running on the PPE. To coordinate processes executing in parallel on the SPE and PPE, atomic operations are often implemented. An atomic operation is one in which an SPU or PPU can read or write to a memory address (often referred to as an atomic) in a single operation while denying other processors access to the atomic. Atomic operations can be mutual exclusion (muxtex) "locked" operations or "lock-free" operations. In a mutex operation, a processor locks the atomic and prevents other processors from writing to it until it is unlocked. In a "lock-free" atomic operation, only one processor can write to the atomic address at a time, but other processors can write over what has been atomically written. Lock-free atomic operations utilize "reservation" operations that notify a processor making the reservation whether an atomic has been overwritten since the reservation was made.

A very common, well understood synchronization primitive used in conjunction with cell processors is known as a "compare and swap" operation. The basic idea of such an operation is to modify a value stored in memory if no other processing element has already done so. The compare and swap operation compares the stored against a specified value. If the values match, the value in memory is updated. If they do not match, the application is notified of a failure. As an example, a compare and swap operation may compare the value stored at memory location 0x7A against the value '10'. If they match, write the value '20' to memory location 0x7A.

It is often desirable to perform compare and swap operations atomically. A problem with atomic operations on cell processors is that the PPU and SPU have different reservations sizes for atomic operations. These different atomic operation sizes are a result of different sized memory access capabilities of the PPU and SPU. The PPU's memory access, is generally limited by the register size of the PPU core. The PPU register length is 64 bits, 8 bytes of 8 bits each. A memory flow controller (MFC) sets the SPU atomic size. The MFC handles direct memory access (DMA) operations for both atomic and non-atomic operations for the SPU. The SPU local store is in the form of 16 byte, 128 bit registers. The SPU local store registers are not tied to any main memory address. The SPU communicates with memory though the MFC, which operates on 128 byte chunks. In certain cell implementations, all atomic operations on the SPU are 128 bytes. However, non-atomic operations handled by the MFC can range in size from 1 byte to 16 kilobytes. Thus, SPUs perform read with reservation and copy 128 bytes into their local stores. The reservation granule can be any size. It will logically work correctly as long as it is larger than the atomic access size.

It is very powerful that the SPU can work atomically on large chunks of data and it can be quite crippling that the PPU can only work atomically on 8 bytes at a time. Such different sizes for atomic reservations can limit the features of a lock-free algorithm. Linked lists without a mutex can be done using lock-free algorithms. However, if larger atomics are available, one can apply lock-free algorithms to more complex operations since more than one integer may be atomically modified at a time. It would be advantageous if the PPU had access to some mechanism to operate atomically on values larger than 8 bytes. Such a feature could facilitate more advanced programming models for SPU utilization.

Thus, there is a need in the art, for a way to perform atomic compare and swap operations with a cell processor where the PPE and SPE have different-sized register lines.

SUMMARY OF THE INVENTION

To overcome the above disadvantages, embodiments of the invention are directed to an atomic compare and swap operation that can be implemented in processor system having a main memory, a power processor element (PPE) and a synergistic processor element (SPE). The PPE and SPE have different sized memory transfer capabilities. The SPE have a larger maximum memory transfer size than the PPE. The PPE notifies an SPE to perform a compare and swap operation on an address in main memory. The address has a size less than or equal to the maximum memory transfer size for the SPE and greater than the maximum memory transfer size for the PPE. The SPE atomically performs the compare and swap operation and notifies the PPE of the success or failure of the compare and swap operation.

The SPE may atomically perform the compare and swap operation by performing a read-with-reservation of a stored value in the address and a comparison involving the stored value and one or more reference parameters. If the comparison is successful the SPE performs a conditional write of a swap value to the address.

Embodiments of the present invention allow the SPE to perform the compare-and-swap operation on behalf of the PPE, thereby taking advantage of the efficiencies inherent in SPE operation.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention implement an SPU-sized Compare-and-Swap operation for the PPU in a cell processor. Such embodiments involve interoperation between SPUs and the PPU in the cell processor. Since there is a non-negligible latency overhead for the PPE to communicate with an SPE, it is desirable for the PPE to communicate with the SPE as little as possible during the compare-and-swap operation.

Figure 1:
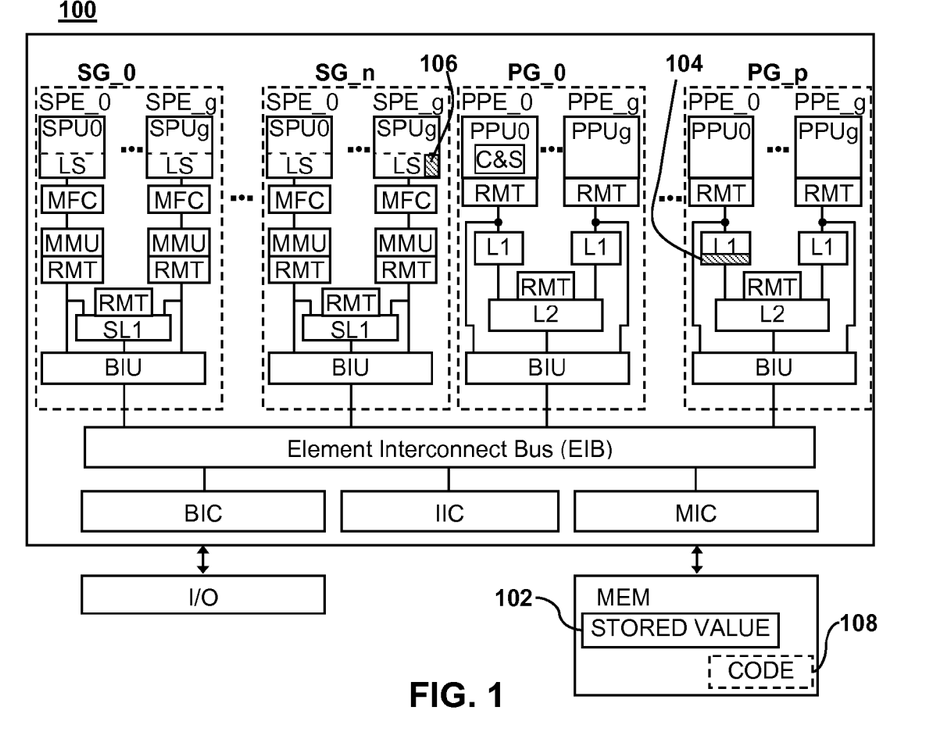
FIG. 1 is a schematic diagram of a cell broadband engine architecture implementing Cell Task and Data Management according to an embodiment of the present invention.

By way of example, and without limitation, FIG. 1 illustrates a type of cell processor 100 characterized by an architecture known as Cell Broadband engine architecture (CBEA)-compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 ... SG_n and a number of groups of PPEs PG_0 ... PG_p. Each SPE group includes a number of SPEs SPE0 ... SPEg. The cell processor 100 also includes a main memory MEM and an input/output function I/O.

Each PPE group includes a number of PPEs PPE_0 ... PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE is made includes an SPU (SPU0 ... SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPE local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Therefore, any required data transfers to, or from, storage elsewhere in a system must always be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device uses an effective address to access the main memory. The effective address is computed when the PPE performs a load, store, branch, or cache instruction, and when it fetches the next sequential instruction. An SPU program must provide the effective address as a parameter in an MFC command. The effective address is translated to a real address according to the procedures described in the overview of address translation in PowerPC Architecture, Book III. The real address is the location in main storage which is referenced by the translated effective address. Main storage is shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory of a system typically includes both general-purpose and nonvolatile storage, as well as special-purpose hardware registers or arrays used for functions such as system configuration, data-transfer synchronization, memory-mapped I/O, and I/O subsystems. There are a number of different possible configurations for the main memory. By way of example and without limitation, Table I lists the sizes of address spaces in main memory for a particular cell processor implementation known as Cell Broadband Engine Architecture (CBEA).

TABLE I

| Address Space | Size | Description |
| --- | --- | --- |
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address Space | $2^n$ bytes | where $65 \leq n \leq 80$ A virtual address is translated to a real address using the page table. |
| Real Page | $2^{12}$ bytes | |
| Virtual Page | $2^p$ bytes | where $12 \leq p \leq 28$ Up to eight page sizes can be supported simultaneously. A small 4-KB (p = 12) page is always supported. The number of large pages and their sizes are implementation-dependent. |

TABLE I-continued

| Address Space | Size | Description |
| --- | --- | --- |
| Segment | $2^{28}$ bytes | The number of virtual segments is 2(n − 28) where 65 ≦ n ≦ 80 |

Note:
The values of "m," "n," and "p" are implementation-dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

In embodiments of the present invention, the main memory MEM contains at some address 102, a stored value that is to be atomically updated using a compare and swap operation initiated by one of the PPE. The address 102, however, contains data of a size that is too large for the PPE to read atomically. For example, the PPE may have 8-byte register lines and the data at the address 102 may be more than 8-bytes. The SPE, on the other hand, may have 128-byte registers in their local stores. As such, the SPE can readily access the data stored at the address 102 in a single atomic read operation provided the stored data at the address 102 is less than 128 bytes. In embodiments of the present invention, one or more of the PPE execute code 104 that causes one of the SPE to implement a compare and swap operation. The compare and swap operation may be embodied as a set of processor readable instructions 106 residing in the local store of a dedicated SPE. The code 104 may be loaded into an L1 cache of the PPE or may be subroutine or function call of a larger program 108 stored in the main memory MEM and executed on one or more PPE. In a like manner, the instructions 106 may be a subroutine or function call of the program 108.

To implement an atomic compare and swap, the code 104 includes features that notify the SPE in the situation where the SPE reads a value of the address 102 and the value is overwritten by another processor before the first processor can write a value back to the address 102. These features make use of the well known instructions "read with reservation" and "conditional write". A read with reservation command, loads data from the address 102 while setting a reservation in the address 102 that will notify the SPE that another processor has tried to load data into the address between the reservation and a subsequent attempt by the SPE to write to it. The conditional write is a command in which the SPE writes to the address only if the reservation has not been lost. Losing reservation means that the reserved data address could have been modified but does specify if it actually has been modified. To figure out whether it has been modified, the address must be read back in (e.g., with reservation) and the current value compared to the value of the address when it was reserved. It is important to note that the only way a conditional write to the address 102 will succeed is if no other processor has written to address 102 between execution of the read with reservation and conditional write commands.

An atomic compare and swap may be implemented according to an embodiment of the present invention as follows, a PPE notifies an SPE to perform a compare and swap operation in address 102. The PPE provides the SPE the address, and additional information for performing the compare and swap operation. The SPE reads the stored value at address 102 with reservation and performs the comparison operation using the stored value and the additional information. If the comparison fails, the SPE notifies the PPE of the failure. If the comparison succeeds, the SPE performs a conditional write of a swap value to the address 102. The swap value may be determined using the addition information. If the conditional write fails, the SPE notifies the PPE of the failure of the conditional write. If the conditional write succeeds, the SPE notifies the PPE of the success of the compare and swap operation.

The foregoing is intended to provide an introduction and description of the terminology used in cell processor implementations. The foregoing discussion is also intended to set forth a context for data structures and methods according to embodiments of the present invention. Such embodiments are not limited to implementation on or with cell processors having the architecture described above. However, any or all of the embodiments described below may be implemented using such cell architecture as an environment in which atomic operations that involve both the SPE and PPE may be encountered and utilized.

Figure 2:
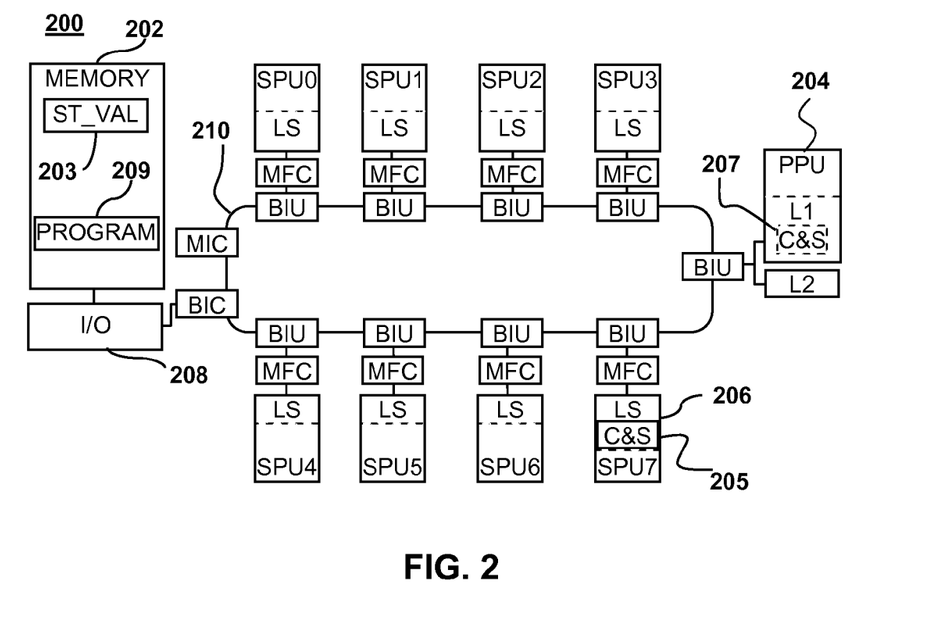
FIG. 2 is a schematic diagram of a cell processor according to an embodiment of the present invention.

FIG. 2 depicts an example of cell processor 200 configured to implement PPE and SPE accessible atomic operations according to an embodiment of the present invention. The cell processor 200 includes a main memory 202, a single PPE 204 and eight SPEs 206. However, the cell processor 200 may be configured with any number of SPE's. With respect to FIG. 2, the memory, PPE, and SPEs can communicate with each other and with an I/O device 208 over a ring-type element interconnect bus 210. The memory 202 contains an address 203 containing data having features in common with the data in address 102 described above. The memory 202 may also contain a program 209 having features in common with the program 108 described above. At least one of the SPE 206 includes in its local store code 205 having features in common with the code 104 described above. The PPE includes in its L1 cache, code 207 having features in common with the code 106 described above. Codes 205, 207 may also be stored in memory 202 for access by the SPE and PPE when needed as described above.

Figure 3A:
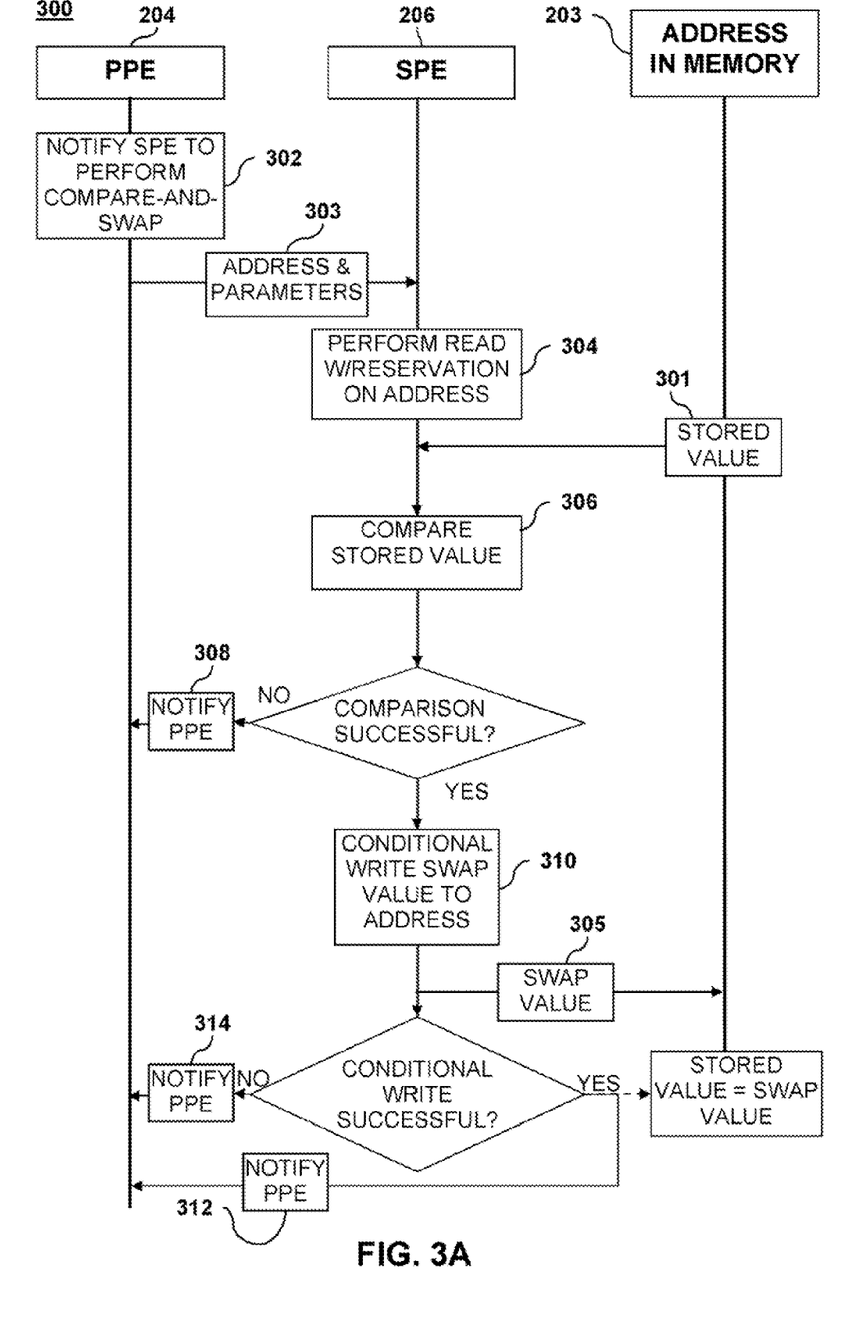
FIG. 3A is a flow diagram illustrating an example of atomic compare and swap cell processor operation according to an embodiment of the present invention.

Operation of the cell processors described above with the codes 104, 106 or 205, 207 may be understood as described below with respect to the flow diagrams of FIGS. 3A-3B. An example of the general compare and swap method 300 is depicted in FIG. 3A. This example may be understood by referring simultaneously to FIG. 3A and to FIG. 2. At step 302 the PPE 204, operating on instructions of code 207, notifies the SPE 206 to perform a compare and swap operation on a certain address 203 in main memory 202. The PPE 204 provides certain information 303 to the SPE at this stage. Such information may include a location of the address 203, a size parameter of a stored value 301 at the address 203 and one or more parameters for performing the comparison and swap operation, a call to one or more functions used to perform the comparison and swap operation. The size parameter tells the SPE 206 how large a block of data it is to compare. In general this value is less than or equal to the size of the register line for the SPE 206 and greater than the size of the register line for the PPE 204. Examples of other possible parameters are described below.

At step 304, the SPE 206, operating on instructions of code 205, performs a read with reservation on the address 203. As described above, execution of this command by the SPE 206 loads the stored value 301 from the address 203 into a local store register of the SPE 206 while setting a reservation on the address 203. At step 306, the SPE 206 performs a comparison operation involving the stored value 301 and one or more reference parameters provided as part of the information 303.

As used herein, a comparison operation is generally taken to mean an operation that returns one of two possible values based on the values of two or more inputs. The two possible values may be represented as "true"/"false", "yes"/no, "1"/ "0", or any other. One of the possible values is deemed to indicate a success of the comparison operation and the other possible value is deemed to indicate a failure. The comparison operation typically involves some logical function involving the stored value in the address and one or more reference parameters, which may be provided by the PPE when it calls on the SPE to perform the comparison.

Table II illustrates examples of information that the PPE may provide to the SPE for the purpose of performing a comparison operation.

TABLE II

| | |
|---|---|
| Address | 0x7A |
| Size | 128 |
| Comparison Function | return stored value == ref_value |
| Reference Parameter(s) | 10 (ref_value) |
| Swap Function | return swap_parameter |
| Swap Parameter(s) | 20 |

In the example of Table II, the comparison function determines whether the stored value is equal to the reference value "10". If it is, the swap function replaces the stored value with the swap parameter 20. It is noted that this example the reference parameters include just a single reference parameter, the reference value. In alternative embodiments, the comparison function may involve two or more parameters that are used e.g., to determine a reference value, or to otherwise determine the outcome of the comparison involving the stored value. It is further noted that the swap parameter in this case is a single value that replaces the stored value if the comparison succeeds. In alternative embodiments, one or more swap parameters may be used (possibly in conjunction with the stored value and/or reference parameters) to calculate a value that replaces the stored value if the comparison succeeds.

By way of example and without limitation some possible comparison functions and corresponding examples and descriptions are listed in TABLE III

TABLE III

| FUNCTION | EXAMPLE | DESCRIPTION |
|---|---|---|
| Logical Equality | A == B | True if A is equal to B |
| Logical Inequality | A ≠ B | True if A is not equal to B |
| | A ≧ B | True if A is greater than or equal to B |
| | A ≦ B | True if A is less than or equal to B |
| | A > B | True if A is greater than to B |
| | A < B | True if A is less than B |
| Functional equality | A = f(B) | True if A is equal to some mathematical function of B. |
| | $f_1(A) = f_2(B)$ | True if the result of a mathematical function of A is equal to the result of a mathematical function of B |
| | $f_1(A) < f_2(B)$ | True if the result of a mathematical function of A is less than the result of a mathematical function of B. |

Examples of mathematical functions f(A) include a function that returns a certain value of A is even and a different value if A is odd. In general any mathematical function of A may be compared in any suitable way to any mathematical function. Note that in the Examples above, the values represented by B and C may refer to reference parameters provided by the PPE 204 as part of the information 303 and the value A may refer to the stored value 301. Furthermore, with respect to the functional equality, the function f(B) may be any suitable mathematical function involving the value of B. Examples of such functions f(B) include (B+C), B−C, B×C, B÷C, C÷B, $B^C$, $C^B$, logarithms of B, trigonometric functions of B, various combinations of two or more of these functions and the like. In the preceding examples, the quantity C may be a parameter value provided by the PPE 204 as part of the information 303. The form of the function f(B) may be determined from a function call provided by the PPE as part of the information 303. In addition the comparison operation may involve combinations of logical functions. Such combinations include AND, OR, NOT, NAND, NOR, XOR, and the like. For example the logical combination (A<B) AND (A<C) returns a true value only if A is greater than B and less than C.

It is further noted that in the preceding examples, the comparison operation is deemed to succeed if the comparison function returns a "true" value. This is not intended as a limitation on all embodiments of the present invention. Those of skill in the art will recognize that a comparison operation may be deemed a success if the underlying comparison function returns a "false" value.

If the comparison operation fails, then at 308, the SPE 206 notifies the PPE 204 of the failure of the compare and swap operation. If the comparison operation succeeds, then at 310, the SPE performs a conditional write of a swap value 305 to the address 203. The swap value 305 may be provided by the PPE 204 as part of the information 303. Alternatively, the SPE 206 may calculate the swap value 305 from parameters and/or function calls provided by the PPE 204 as part of the information 303. As set forth above, the conditional write of the swap value 305 only succeeds if the address 203 has not been written to between the read with reservation step 304 and the conditional write step 308. If the conditional write succeeds, the stored value 301 in the address 203 has been changed to the swap value 305. The SPE 206 notifies the PPE 206 of the success of the comparison and swap operation at step 312. Notification of the PPE at step 312 or 314 may be implemented, e.g., using signal notification registers, mailboxes, or by writing to a location in main memory 202 that is regularly polled by the PPE 204 as part of the code 207.

If the conditional write fails, the SPE 206 notifies the PPE 204 of the failure of the comparison and swap operation at 314. The SPE 206 may also indicate to the PPE 204 whether the comparison operation at 306 had succeeded. Within the context of the program 209, it may be useful for the PPE 204 or SPE 206 to know that the stored value 301 was changed, what it was changed to and which SPE or PPE changed it. With such information, the SPE 206 could help out other SPEs or the PPE 204. Therefore it may be useful, in the event the conditional write fails, for the SPE 206 to re-read the address 203 to determine the new value and perform other steps before notifying the PPE 204 at step 314.

Figure 3B:
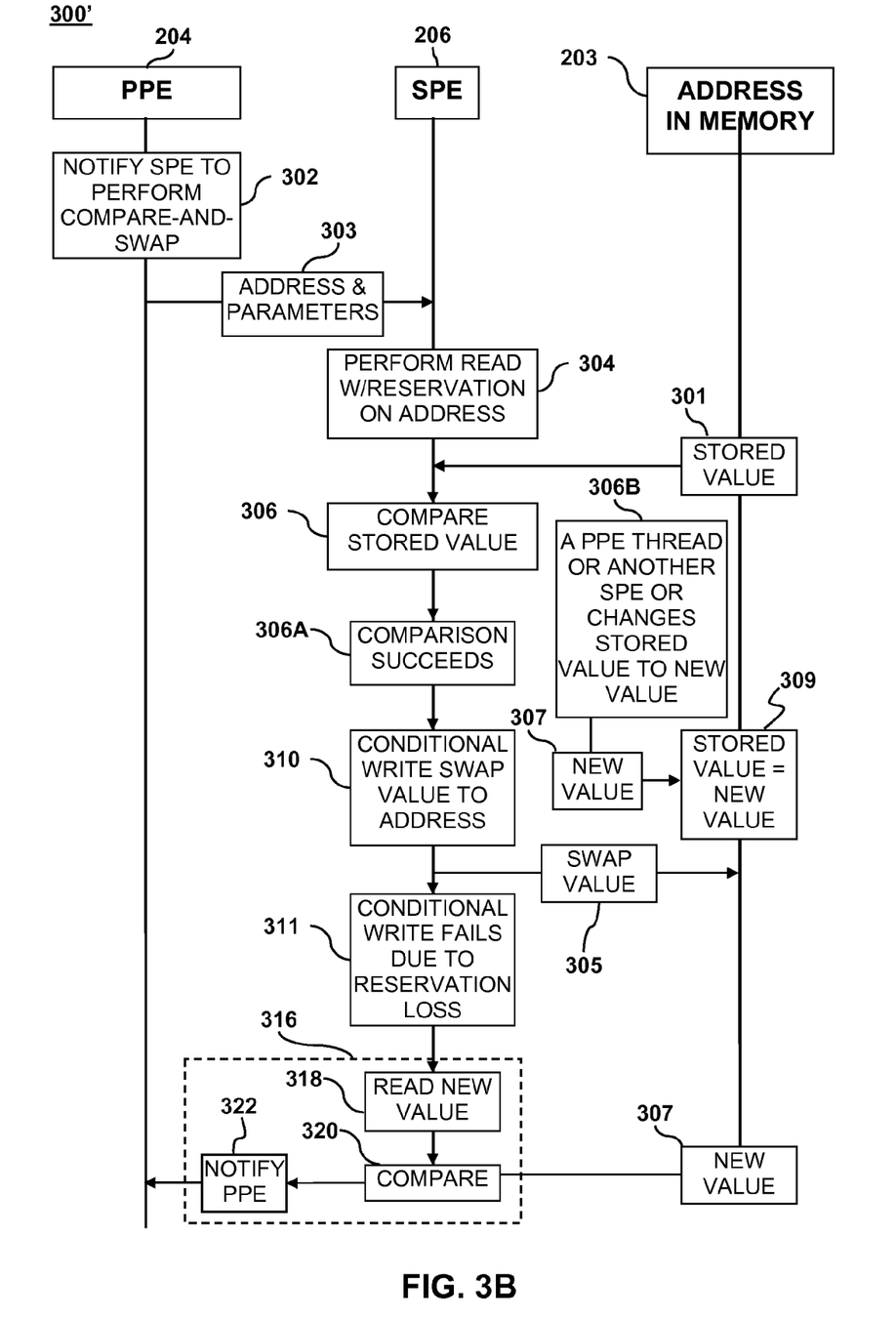
FIG. 3B is a flow diagram illustrating an example of an interrupted atomic compare and swap cell processor operation according to an embodiment of the present invention.

FIG. 3B illustrates an example of the process flow in a compare and swap method 300' in the event the comparison operation succeeds but the conditional write fails. The method 300' follows the steps of the method 300 as described above up to and including comparing the stored value 301 at step 306 and performing the conditional write of the swap value 305 at step 310. In this example, it is assumed that the comparison succeeded as indicated at 306A. However, at 306B, between the read with reservation at step 304 and the conditional write at step 308 a PPE thread or another SPE writes a new value 307 to the address 203 and changes the stored value 301 to the new value 307 as indicated at 309. This causes the reservation placed on the address 203 at step 304 to be lost. As a result, at 311 the conditional write fails due to the reservation loss. The SPE 206 then executes a set of conditional instructions 316.

These conditional instructions 316 may be part of the code 205. As part of the conditional instructions 316, the SPE reads the address 203 to determine the new value 307 as indicated at 318. The SPE then performs a comparison operation at 320. This comparison operation may be the same as the comparison operation performed at step 306 or it may be different. In either event, the SPE 206 notifies the PPE 204 of the failure of the conditional write at 322. The SPE 206 may optionally notify the PPE 204 of the new value 307 and the result of the comparison operation at step 320.

In preferred embodiments of the invention the compare and swap operation utilizes a dedicated SPE, i.e., one that is reserved to be available specifically to perform compare-and-swap operations. This same dedicated SPE may also be used for other PPE-supplementary functions. As used herein, a PPE-supplementary function is one which the PPE delegates to an SPE to take advantage of particular characteristics of the SPE, e.g., faster DMA transfers or larger sized register lines. By way of example, and without limitation, the PPE-supplementary function may be a memcopy function where the PPE instructs an SPE to copy data from one location in main memory to another location in main memory. Examples of memcopy implementation with an SPE are described in commonly-assigned co-pending U.S. patent application Ser. No. 11/238,085, the entire disclosures of which are incorporated herein by reference.

The use of read-with-reservation and conditional write allows atomic operation of the compare and swap without locking. Such features allow embodiments of the compare and swap operation described herein to be tolerant to the PPU thread being swapped out. The compare-and-swap operations described herein are particularly useful in situations where the PPE is not concerned that the reservation has been lost provided the comparison is successful. Examples of such situations include comparing and swapping a description of a task that an SPE should perform. In such a case the SPE may compare the value of a pointer to a location in memory where the code to execute would reside and parameters for that code. Alternatively, the SPE may compare and swap application state information. In the case of video games, examples of such information include game variables (how much life the player has), virtual world information (what is the position of this rock) or sound processing information.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A processor system, comprising:
   a main memory;
   a first processor and a second processor that operate on different sized memory access capabilities,
   wherein the first processor is configured to notify the second processor to perform a compare and swap operation on an address in the main memory, wherein a size of the address is less than or equal to a maximum memory transfer size for the second processor and greater than a maximum memory transfer size for the first processor, wherein the maximum memory transfer size for the second processor is larger than the maximum memory transfer size for the first processor;
   wherein the second processor is configured to atomically perform the compare and swap operation; and
   wherein the second processor is configured to notify the first processor of the success or failure of the compare and swap operation,
   wherein the compare and swap operation includes:
      performing a read-with-reservation of a stored value in the address with the second processor,
      performing a comparison with the second processor, wherein the comparison involves the stored value and one or more reference parameters,
      if the comparison is successful, performing a conditional write of a swap value to the address with the second processor.

2. The system of claim 1 wherein performing the comparison with the second processor involving the stored value and one or more reference parameters includes performing a logical operation with the second processor, the logical operation involving the stored value and the one or more reference parameters, wherein the logical operation returns a value of true or false.

3. The system of claim 2 wherein the compare and swap operation is successful if the logical operation returns a value of true and the conditional write of the swap value is successful.

4. The system of claim 2 wherein the compare and swap operation is successful if the logical operation returns a value of false and the conditional write of the swap value is successful.

5. The system of claim 2 wherein the one or more reference parameters include a single reference value and the logical operation returns a true or false value based on a comparison of the stored value to the single reference value.

6. The system of claim 2 wherein the one or more reference parameters include a single reference value and the logical operation is a logical equality operation that returns a true value if the stored value is equal to the single reference value.

7. The system of claim 1, wherein using the first processor to notify the second processor to perform a compare and swap operation on the address in main memory includes passing to the second processor an address, the one or more reference parameters and one or more swap parameters.

8. The system of claim 1 wherein using the first processor to notify the second processor to perform a compare and swap operation on the address in main memory includes passing to the second processor the address, the swap value, and the one or more reference parameters.

9. The system of claim 1 wherein using the first processor to notify the second processor to perform a compare and swap operation on the address in main memory includes passing to the second processor the address and a size of the stored value.

10. The system of claim 1 wherein using the first processor to notify the second processor to perform a compare and swap operation on the address in main memory includes passing to the second processor an address, the one or more reference parameters and one or more swap parameters and wherein compare and swap operation includes calculating the swap value with the one or more swap parameters.

11. The system of claim 1 wherein comparing the stored value to the one or more reference parameters includes determining whether the stored value is equal to a reference value.

12. The system of claim 1, wherein the compare and swap operation further comprises, if the stored value has been overwritten between performing the read with reservation and performing the conditional write, performing another read-with-reservation of the stored value, performing another comparison operation involving the stored value and one or more reference values, and notifying the first processor if the comparison fails.

13. The system of claim 1 wherein performing the compare and swap operation includes the step of calculating the swap value.

14. The system of claim 1 wherein performing the compare and swap operation includes the step of calculating a reference value using the one or more swap parameters.

15. The system of claim 1 wherein the swap value is the result of a function of the stored value.

16. The system of claim 1 wherein the swap value is the result of a function of the stored value and one or more parameters provided by the first processor.

17. The system of claim 1 wherein the swap value is equal to the sum of the stored value and an incremental value.

18. The system of claim 1, wherein the method further comprises dedicating a second processor to be notified by the first processor to perform the compare and swap operation.

19. The system of claim 1, wherein the method further comprises dedicating a second processor to be notified by the first processor to perform the compare and swap operation, wherein atomically performing the compare and swap operation is done by the dedicated second processor.

20. A processor system, comprising:
a main memory;
a first processor coupled to the main memory;
one or more second processors coupled to the first processor and the main memory, wherein each of the one or more second processors has an associated local store, wherein the first and second processors have different size memory transfer capabilities, wherein a maximum second processor memory transfer size is larger than a maximum first processor memory transfer size;
a first set of processor readable instructions embodied in main memory or in one or more registers of the first processor, the first set of processor readable instructions including an instruction to notify one of the one or more second processors to perform a compare and swap operation on an address in the main memory, wherein a size of the address is less than or equal to a maximum second processor memory transfer size and greater than the maximum first processor memory transfer size;
a second set of processor readable instructions embodied in the main memory or in one or more registers of a local store of one or more of the second processors, the second set of processor readable instructions including an instruction to perform the compare and swap operation on the address, and an instruction to notify the first processor of the success or failure of the compare and swap operation.

21. The system of claim 20 wherein the instruction to perform the compare and swap operation on the address includes:

an instruction to read a stored value in the address with the second processor;
an instruction to perform a comparison with the second processor, wherein the comparison involves the stored value and one or more reference parameters; and
an instruction to notify the first processor if the comparison is not successful.

22. The system of claim 20 wherein the comparison includes a logical operation involving the stored value and the one or more reference parameters, wherein the logical operation returns a value of true or false.

23. The system of claim 22 wherein the compare and swap operation is successful if the logical operation returns a value of true and the conditional write of the swap value is successful.

24. The system of claim 22 wherein the compare and swap operation is successful if the logical operation returns a value of false and the conditional write of the swap value is successful.

25. The system of claim 22 wherein the logical operation is a logical equality operation that returns a true value if the stored value is equal to a single reference value.

26. The system of claim 20 wherein the one or more second processors include a dedicated second processor, wherein the first set of processor readable instructions include an instruction notify the dedicated second processor to perform a compare and swap operation on the address in the main memory.

27. The system of claim 20 wherein the one or more second processors include a dedicated second processor, wherein the first set of processor readable instructions a include an instruction notify the dedicated second processor to perform a compare and swap operation on an address in the main memory, and wherein the dedicated second processor has the second set of instructions embodied in its local store.

28. The system of claim 27 wherein the dedicated second processor is configured to implement other first processor-supplementary functions.

29. The system of claim 28 wherein the other first processor-supplementary functions include a memcopy function.

30. The system of claim 20 wherein the instruction to perform the compare and swap operation further comprises a conditional instruction set to be executed if the stored value has been overwritten between performing the read with reservation and performing the conditional write, the conditional instruction set including an instruction for the second processor to perform another read-with-reservation of the stored value, and an instruction for the second processor to perform another comparison operation involving the stored value and one or more reference values.

31. The system of claim 20 wherein the compare and swap operation includes the step of calculating the swap value.

32. The system of claim 20 wherein the compare and swap operation includes the step of calculating the reference value.

33. The system of claim 20 wherein the swap value is the result of a function of the stored value.

34. The system of claim 20 wherein the swap value is the result of a function of the stored value and one or more parameters provided by the first processor.

35. The system of claim 20 wherein the swap value is equal to the sum of the stored value and an incremental value.

36. The system of claim 20 wherein the maximum second processor memory transfer size is 128 bytes and the maximum first processor memory transfer size is 8 bytes.

37. In a processor system having two or more processors including a main memory, a first processor and a second processor, wherein the first and second processors operate on different sized memory access capabilities, a method for atomic operation, the method comprising:
- using the first processor to notify a second processor to perform a compare and swap operation on an address in main memory, wherein a size of the address is less than or equal to a maximum memory transfer size for the second processor and greater than a maximum memory transfer size for the first processor, wherein the maximum memory transfer size for the second processor is larger than the maximum memory transfer size for the first processor;
- atomically performing the compare and swap operation with the second processor; and
- with the second processor, notifying the first processor of the success or failure of the compare and swap operation,
- wherein the compare and swap operation includes:
  - performing a read-with-reservation of a stored value in the address with the second processor,
  - performing a comparison with the second processor, wherein the comparison involves the stored value and one or more reference parameters,
  - if the comparison is successful, performing a conditional write of a swap value to the address with the second processor.

38. A non-transitory processor readable storage medium having embodied therein a set of processor executable instructions for implementing a method for atomic operation in a processor system having two or more processors including a main memory, a first processor and a second processor that operate on different sized memory access capabilities, the method comprising:
- using the first processor to notify one of the one or more second processors to perform a compare and swap operation on an address in main memory, wherein a size of the address is less than or equal to a maximum memory transfer size for the second processor and greater than a maximum memory transfer size for the first processor, wherein the maximum memory transfer size for the second processor is larger than the maximum memory transfer size for the first processor;
- atomically performing the compare and swap operation with the second processor; and
- with the second processor, notifying the first processor of the success or failure of the compare and swap operation,
- wherein the compare and swap operation includes:
  - performing a read-with-reservation of a stored value in the address with the second processor,
  - performing a comparison with the second processor, wherein the comparison involves the stored value and one or more reference parameters,
  - if the comparison is successful, performing a conditional write of a swap value to the address with the second processor.

* * * * *